United States Patent
Eades et al.

(10) Patent No.: US 12,201,236 B2
(45) Date of Patent: Jan. 21, 2025

(54) PORTABLE SOUS VIDE COOKING APPLIANCE

(71) Applicants: Michael R Eades, Incline Village, NV (US); Ted M Eades, Dallas, TX (US); Mary Dan Eades, Incline Village, NV (US); Daniel J Eades, Santa Barbara, CA (US)

(72) Inventors: Michael R Eades, Incline Village, NV (US); Ted M Eades, Dallas, TX (US); Mary Dan Eades, Incline Village, NV (US); Daniel J Eades, Santa Barbara, CA (US)

( * ) Notice: Subject to any disclaimer, the term of this patent is extended or adjusted under 35 U.S.C. 154(b) by 1143 days.

(21) Appl. No.: 16/245,133

(22) Filed: Jan. 10, 2019

(65) Prior Publication Data
US 2019/0208946 A1    Jul. 11, 2019

Related U.S. Application Data

(60) Provisional application No. 62/615,742, filed on Jan. 10, 2018.

(51) Int. Cl.
*A47J 27/10*    (2006.01)
*A47J 27/00*    (2006.01)

(52) U.S. Cl.
CPC .......... *A47J 27/10* (2013.01); *A47J 27/004* (2013.01)

(58) Field of Classification Search
CPC .............................. A47J 27/10; A47J 27/004
See application file for complete search history.

(56) References Cited

U.S. PATENT DOCUMENTS

| | | | | |
|---|---|---|---|---|
| 2,666,838 A | * | 1/1954 | Krah | H05B 3/80 219/515 |
| 2,711,474 A | * | 6/1955 | Krichton | H05B 3/80 392/498 |
| 3,797,563 A | * | 3/1974 | Hoffmann | F25D 19/00 165/48.1 |

(Continued)

FOREIGN PATENT DOCUMENTS

| WO | WO2011031306 A2 | 3/2011 | |
|---|---|---|---|
| WO | WO-2013170266 A1 | * 11/2013 | A47J 27/10 |

OTHER PUBLICATIONS

EP 19738020.7—Extended European Search Report mailed Aug. 31, 2021.

*Primary Examiner* — Steven N Leff
(74) *Attorney, Agent, or Firm* — Aldo Noto, Esq.; RIMON PC

(57) ABSTRACT

A portable sous vide cooking appliance that does not require a motor to physically move water or have its own container is provided. The portable sous vide cooking appliance may be used with a separate pot or other container holding water. The sous vide cooking appliance requires no water circulators to function. Unlike immersion circulators, only the heating element and the mechanism for delivering power to the heating element are immersed in water. The sous vide cooking appliance described requires no electric motor, no impeller pump, no water intakes and no water outtakes. Further, unlike immersion circulators, the sous vide cooking appliance passively circulates water through convection currents and are not required to actively agitate the water bath, creating noise and more evaporation and steam.

20 Claims, 16 Drawing Sheets

(56) References Cited

U.S. PATENT DOCUMENTS

| | | | | |
|---|---|---|---|---|
| 5,118,927 | A * | 6/1992 | Eisenhauer | A47J 36/2433 |
| | | | | 165/132 |
| 6,119,587 | A * | 9/2000 | Ewald | A47F 10/06 |
| | | | | 426/418 |
| 6,955,118 | B1 * | 10/2005 | Bivens | A47J 37/1285 |
| | | | | 210/167.28 |
| 7,211,770 | B2 * | 5/2007 | Wilson | A47J 37/1261 |
| | | | | 219/439 |
| 7,586,065 | B2 * | 9/2009 | Kehoe | A47J 27/10 |
| | | | | 219/432 |
| 9,220,362 | B2 * | 12/2015 | Eades | A47J 27/10 |
| 2002/0023544 | A1 * | 2/2002 | Song | A47J 37/1209 |
| | | | | 99/330 |
| 2005/0034611 | A1 | 2/2005 | McLemore | |
| 2008/0006624 | A1 * | 1/2008 | Davis | H02G 3/123 |
| | | | | 220/3.2 |
| 2008/0066624 | A1 | 3/2008 | Taylor et al. | |
| 2009/0087534 | A1 * | 4/2009 | McLemore | A47J 37/1266 |
| | | | | 426/523 |
| 2011/0185915 | A1 * | 8/2011 | Eades | A47J 27/21058 |
| | | | | 99/331 |
| 2015/0342388 | A1 * | 12/2015 | Wu | A47J 37/1266 |
| | | | | 700/300 |
| 2016/0220064 | A1 * | 8/2016 | Young | A47J 27/10 |

\* cited by examiner

PORTABLE SOUS VIDE COOKING APPLIANCE

RELATED APPLICATIONS

The application claims priority to U.S. Provisional Application Ser. No. 62/615,742 filed Jan. 10, 2018, which is incorporated by reference herein.

BACKGROUND

In sous vide cooking, an even temperature throughout the water in a pot is preferable. Conventionally, there are two types of sous vide cookers, self-contained cooking ovens that hold water and hand-held immersion circulators. The self-contained cooking ovens are generally large and take up significant counter space. Immersion circulators are used to move the water in the pot. They can be hand-held, are smaller and can be stored but have many disadvantages including noise, reliability, accurate temperature control in larger water baths and evaporation. Immersion circulator units further require an electric motor to run an impeller pump necessary to draw the water across its heating element. The immersion circulators draw water into the internals of the unit and heat the water before pumping or forcibly circulating the water.

Consequently, having to use a large non-portable, self-contained oven, or requiring a motor to physically move water in a container may be disadvantageous. Accordingly, it is desirable to solve these and other related problems.

SUMMARY

A portable sous vide cooking appliance for use with a separate container holding a liquid, is provided comprising a control unit comprising a PID (Proportional Integral Derivative) controller and a control panel. The cooking appliance further comprises a flat circular heating element configured to be located at the bottom of the container, and that causes convection current movement of the liquid in the container upward from the heating element, and a wire operably connected from the control unit to the heating element to provide power to the heating element. It further comprises a temperature sensor operably connected to the control unit, wherein the temperature sensor senses a temperature of the liquid. The PID controller controls, to within 1 degree, the temperature of the liquid in the container using the temperature sensor and the heating element.

A portable sous vide cooking device, without a motor, for use with a separate container holding a liquid, is provided comprising a heating element configured to cover a majority of a bottom of the separate container. The portable sous vide cooking device further comprises a control unit controlling the heating element to regulate a temperature of the liquid in the separate container for sous vide cooking, and a conduit connecting the control unit and the heating element. The portable sous vide cooking device includes no motor to circulate water and no attached container for holding the liquid.

A method of using a portable sous vide cooking appliance having a heating element, a control unit and no motor for circulating water, is provided comprising activating the heating element in a separate container containing a liquid for sous vide cooking without a motor for circulating water, the heating element connected to the control unit by a conduit. The method further comprises detecting a temperature of the liquid in the separate container by a temperature sensor connected by a conduit to the control unit, and determining, by the control unit, whether to deactivate and activate the heating element based on the temperature of the liquid. The method further comprises deactivating and activating the heating element by the control unit based on the determination.

DETAILED DESCRIPTION

Figure 1A:
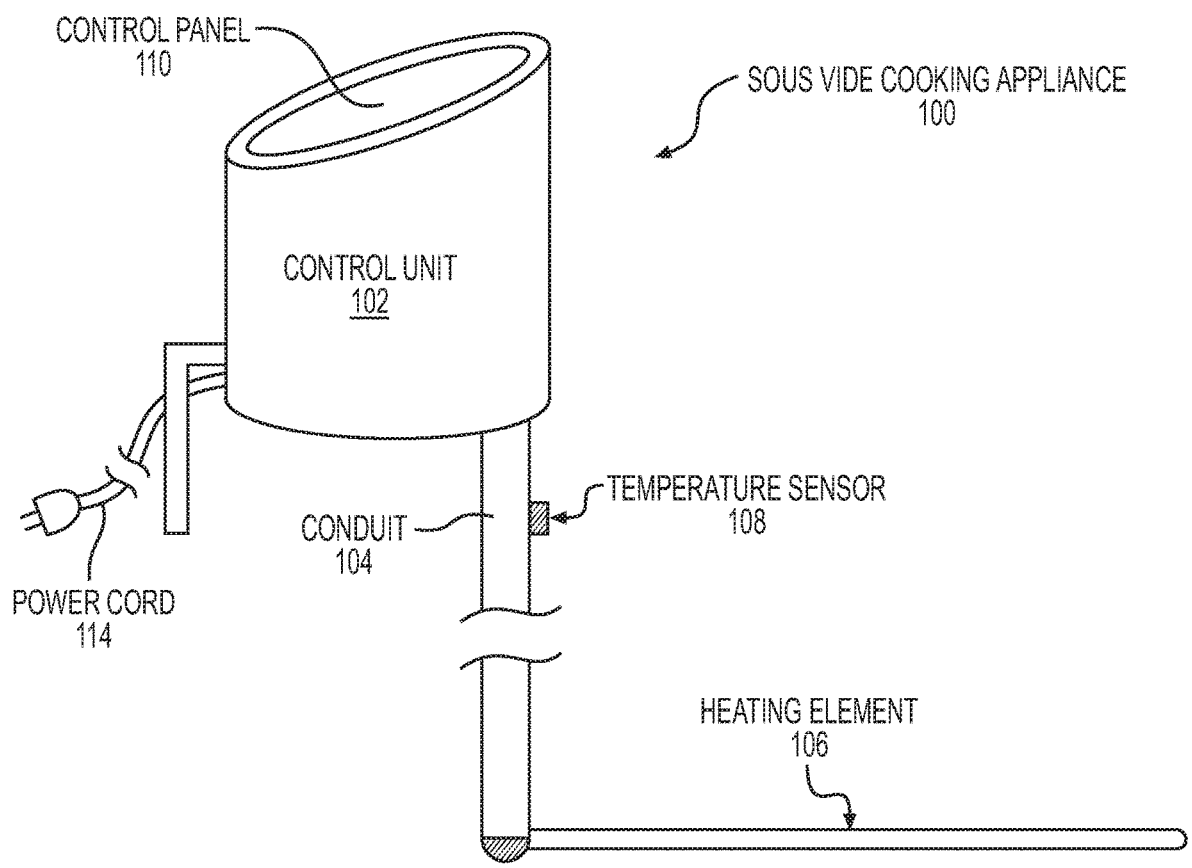
FIG. 1A illustrates a sous vide cooking appliance in accordance with one embodiment.

A portable sous vide cooking appliance that does not require a motor to physically move water or have its own container is provided. The portable sous vide cooking appliance may be used with a separate stock pot or other container holding water. Unlike immersion circulators, in one embodiment of the sous vide cooking appliance, only the heating element and its protected conduit to supply power make contact with the water in the sous vide water bath. The sous vide cooking appliance requires no water circulators to function. The sous vide cooking appliance described requires no electric motor, no impeller pump, no water intakes and no water outtakes. Further, unlike immersion circulators, the sous vide cooking appliance passively circulates water through convection currents and are not required to actively agitate the water bath, creating noise and more evaporation and steam.

The sous vide cooking appliance includes a control unit with a control panel and electronics, as well as a power connection to a heating element and a temperature sensor. In another embodiment, the control panel and electronics are in a separate self-contained unit outside of the cooking container connected with a cord. A PID (Proportional Integral Derivative) controller in the control unit in conjunction with the temperature sensor and heating element are used to accurately control the temperature of the cooking water. In one embodiment, the sous vide cooking appliance hooks on to the side of the cooking container, and in another embodiment the control unit is separate from the cooking container and self-contained.

The portable sous vide cooking appliance is effectively a free-standing PID heating unit using only convection currents as opposed to motors to circulate water. Contrarily, the immersion circulators (typically shaped like a wide stick) require an impeller pump or some other way to move the water over the small heating element located in the tube of the immersion unit. If they have no way to circulate the water, they cannot heat the water evenly. The portable sous vide cooking appliance uses a heating element that covers the bottom of whichever container users choose to use. In one implementation, a number of different interchangeable heating elements can be plugged into the control unit so that the heating elements are sized according to the size of the container. Since the heating element covers substantially the entire base of the container in which the water resides and the food cooks, a convection current is generated that keeps the water temperature constant throughout, and does so without its own insulated container. The user provides their own cooking pot, container or basin.

Several different-sized heating elements can be plugged into the control unit. Users may use the heating element(s) based on what size container they plan to cook in. These different-sized heating elements may run by the same control unit, and the control unit may drive varying sizes of heating elements. This is in contrast to both baths and immersion circulators which have a control unit that drives only one size heating element, which is the heating element included with the unit.

FIG. 1A shows a sous vide cooking appliance 100 with four main parts, a control unit 102, a conduit 104 (carrying power), a silicone-encased resistance heating element 106 and a temperature sensor 108. In one embodiment, the control unit 102 contains a Printed Circuit Board (PCB) and a control chip or processor with a PID algorithm programmed therein. The control unit 102 may also have a memory having software for implementing processes described herein. The sous vide cooking appliance 100 may be operated through a touch screen, buttons on a control panel 110 or other suitable input. In one embodiment, the control unit 102 has a generally cylindrical housing with a slanted top. The electronics of the control unit 102 are inside the housing. In one embodiment, the control panel 110 is located on the top of the control unit. The electrical power comes into the power source in the control unit 102 via a power cord 114 and is reduced to 5V to run the electronics while shunting full power to the heating element 106. The sous vide cooking appliance 100 may be 110V, 220V or dual-voltage. The sous vide cooking appliance 100 can include other boards, chips, display drivers and interfaces. The sous vide cooking appliance 100 maintains consistent water temperature in a water bath, for example, to within 0.5 degrees for extended cooking times. In some embodiments, the control unit 102 is programmable and includes a timer.

The sous vide cooking appliance 100 may be sized as a hand-held and is portable for easier storage in kitchen cabinets. Users use their water container 112, such as a stock pot, to cook with the sous vide cooking appliance 100. Because convection current water flow is created by the sous vide cooking appliance 100, the exemplary appliance shown in FIG. 1A does not forcibly circulate water. No pump or impeller is required for the sous vide cooking appliance 100 to properly operate. A conduit 104 running from the control unit 102 to the heating element 106 carries the electric wire or cord (electricity) to the heating element at the bottom.

In some embodiments, the conduit 104 is flexible and in others it is hard or stiff. In some embodiments, the conduit 104 is adjustable, for example it may telescope or otherwise change in length. By changing length, the conduit 104 is able to adapt the sous vide cooking appliance 100 to pots or other containers 112 of differing height. The conduit 104 is made from for example a plastic, aluminum, steel stainless steel, rubber, etc. In one embodiment, a plastic tube is used. In yet another embodiment, a tube within a tube design is used to allow telescoping of the conduit 104. In some embodiments, the conduit 104 would be water tight.

Temperature sensors 108 are used by the sous vide cooking appliance 100 to control the temperature of water in the stock pot or other cooking container 112. In some embodiments, multiple temperature sensors 108 are used (e.g., two, three, four, etc.). The temperature sensors 108 may be located in different positions while still being connected to provide or feed data to the PID controller (not shown) in the control unit 102. For example, in one embodiment, the temperature sensor 108 can be outside the conduit 104 and in contact with the water of the water bath (shown in FIG. 1B). In some embodiments, the temperature sensor(s) 108 are located inside the conduit 104 to monitor the temperature of the water bath and send temperature information back to the PID controller to maintain the constant temperature required for sous vide cooking. In these embodiments, the temperature sensor 108 does not directly contact the water. To accommodate the temperature sensor's lack of contact with the water, a temperature adjustment algorithm is used. The temperature is adjusted from an inside the conduit temperature to the actual water temperature of the water bath. A detailed description of the PID controller and temperature measurements is disclosed in U.S. Pat. No. 9,220,362 issued Dec. 29, 2015, which is incorporated by reference herein.

During manufacture or set-up, using a separate device, temperature readings are taken of the water while readings are taken with the temperature sensors 108 of the sous vide cooking appliance 100. The actual water temperature readings are entered into the sous vide cooking appliance 100 and the PID controller adjusts the temperature sensor readings to account for the lack of contact with the water. By indirectly taking the water temperature, the temperature sensors 108 may be protected from the water and the elements providing greater reliability and longer life cycle for the temperature sensor components. Because the temperature sensor(s) 108 do not have direct contact with the water inside the water bath, the temperatures measured by the temperature sensor(s) 108 are typically different from the actual water temperature inside the pot by a margin of a fraction of a degree Fahrenheit to several degrees Fahrenheit or possibly more, depending on the thermal conductivity of the protective material surrounding the temperature sensor(s) 108 (e.g., flexible conduit, wrapping, retractable reel housing and the location of the temperature sensor). Temperature adjustment or conversion factors $k_1 \ldots k_n$ are experimentally determined for each configuration and individual temperature sensor(s) 108 so that the measured temperature (MT) reflects the actual water temperature in the pot. Therefore, the temperature determination algorithm allows for precise measurement and control of the water cooking temperature.

In one embodiment, a button control program allows the manufacturer to program the PID controller through a series of tests so that the displayed temperature reflects the actual water temperature inside the cooking chamber. In one embodiment, the PID controller is initialized at three temperature settings, for example: setting A=30 degrees C., setting B=60 degrees C., and setting C=90 degrees C. Briefly, an exemplary water bath is filled, and the PID controller is set at a cooking temperature of 30 degrees C. After the setting temperature is reached on the PID display (i.e., the temperature measured by the temperature sensor is 30 degrees C.), the actual water temperature of the water bath is measured directly by placing a reference thermometer inside the water. The difference between the displayed temperature (i.e., the temperature measured by the temperature sensor 108) and the measured temperature (i.e., the actual water temperature measured with the reference thermometer) at the 30 degrees C. setting is entered and stored on a memory chip inside the PID controller or other memory device. This process is repeated at the temperature settings of 60 degrees C. and 90 degrees C. The stored temperature differences, referred to as adjustment values "A," "B" and "C" for adjustment made at 30 degrees C., 60 degrees C. and 90 degrees C., respectively, are then used by the PID controller to achieve precise control of the cooking temperature in future temperature control cycles.

Temperature measured by the temperature sensor 108 is changed from an analog signal to a digital value by the sensor A/D detection, and the control unit 102 calculates the actual cooking temperature of the water bath by using the temperature offset program using a temperature adjustment algorithm and the stored "A," "B," and "C" adjustment values. In one embodiment, the temperature correction algorithm creates a temperature adjustment curve using the stored adjustment values. The temperature adjustment curve can be created with a straight-line method, a best fit method or any other method commonly known in the art. For each measured temperature $T_m$, the curve provides a temperature adjustment value $T_d$. The temperature correction algorithm then calculates actual temperature value $T_a$ using the formula $T_a = T_m + T_d$.

In one embodiment, the temperature adjustment program calculates the difference $E_k$ between the setting temperature and the calculated actual temperature $T_a$ and calculates the proportion and differential items. The program then decides whether the control value (i.e., the output of the PID controller) of the previous calculation $U_{(k-1)}$ is greater than the maximum value of the output of the PID controller in prior iterations $U_{max}$. If $U_{(k-1)}$ is not greater than $U_{max}$, the program then decides whether $U_{(k-1)}$ is smaller than the minimum value of the output of the PID controller in prior iterations $U_{min}$. If $U_{(k-1)}$ is smaller than $U_{min}$, the program decides whether $E_k$ is smaller than zero. If $E_k$ is not smaller than zero, the program calculates a new integral item and then the new control value $U_k$ based on the calculated proportion, differential and integral items. If $E_k$ is smaller than zero, the program bypasses the routine. If $U_{(k-1)}$ is greater than $U_{min}$, the program calculates a new integral item and then the new control value $U_k$ based on the calculated proportion, differential and integral items.

If $U_{(k-1)}$ is greater than $U_{max}$, the program then decides whether $E_k$ is greater than zero. If $E_k$ is not greater than zero, the program calculates a new integral item and then the new control value $U_k$ based on the calculated proportion, differential and integral items. If $E_k$ is greater than zero, the program bypasses any unnecessary program steps.

The heating element 106 is controlled based on the control value $U_k$. A program provides an audio signal to the user if for example, over-heating is detected or if the set cooking time is reached.

In some embodiments, the PID controller uses a temperature correction algorithm that implements a temperature conversion factor. In some embodiments, the temperature conversion factor is not a fixed offset. Using the PID controller, the temperatures measured by the one of more temperature sensors reflect actual water temperature in the pot within 0.5 degrees Celsius.

A description of the temperature adjustment algorithm and PID controller is found in U.S. Pat. No. 9,220,362 issued Dec. 29, 2015 which is incorporated by reference herein. Temperature adjustment algorithms are also deployed, for example, in the Sous Vide Supreme® Oven product sold by Eades Appliance Technology, LLC in the United States and Europe.

In some embodiments, the upper end of the conduit 104 is connected to the control unit 102 and the lower end or bottom of the conduit is connected to a silicone-coated heating element 106. The heating element 106 is configured to cover a substantial part or all of the bottom of a container 112 which may be a standard stock pot, for example. Generally, the more area of the bottom of the stock pot covered by the heating element, the more even the heating. The heating element 106 creates convection currents throughout the water in the pot or cooking container 112.

In some embodiments, the sous vide cooking appliance 100 includes a connection or hinge at the point in which the heating element connects to the conduit 104. Various types of connections and hinges between the conduit 104 and heating element 106 may be used. For example, the connection may comprise one or more of joint, ball and socket joint, saddle joint, butt hinge, double hinge, T-hinge, pintle hinge, strap hinge, pivot and swivel hinge. In some embodiments, the connector or hinge enables the sous vide cooking appliance 100 to fold so that the heating element 106 swivels or folds toward the conduit 104 and the control unit 102. The sous vide cooking appliance 100 may be folded for ease of storage, transport and packaging.

Figure 1B:
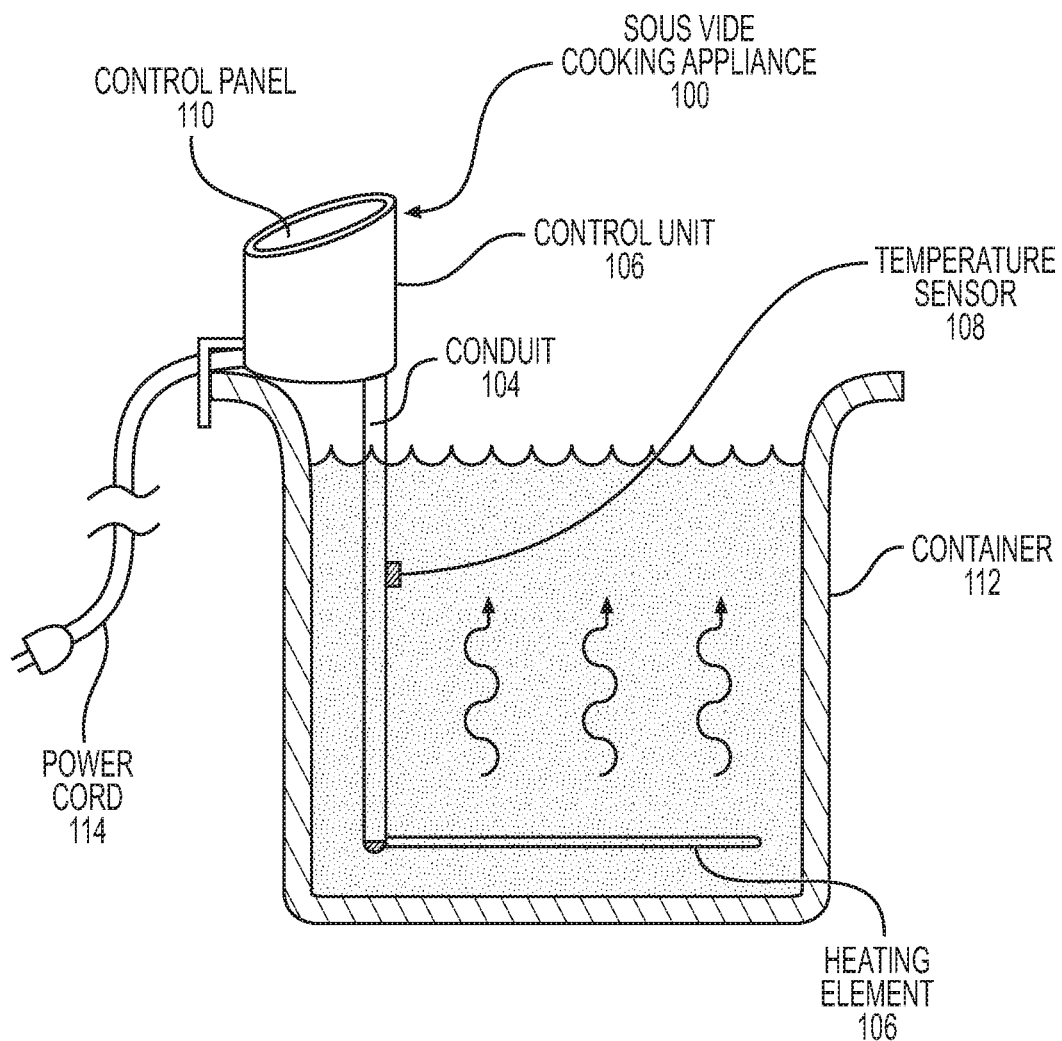
FIG. 1B is a cut-away side view of an exemplary sous vide cooking appliance in a stock pot filled with water.

Referring to FIG. 1B, a sous vide cooking appliance 100 is shown in use with an uncovered container 112 (e.g., stock pot) filled with water. The control unit 102 sits at the approximate height of the pot lip or lid. In some embodiments, the control unit 102 sits above the water and is not submersed. In other embodiments, the control unit housing is in contact with the water and may also include a temperature sensor 108. A clip helps to hold and steady the control unit housing. In some embodiments, the clip is a square bracket. Other shapes for the clip may be used.

The heating element 106 is shown at the bottom of the container 112 with the power conduit 104 extending vertically from the control unit 102 to the heating element. A connector holds the hard conduit 104 to the heating element 106. A temperature sensor 108 is shown mounted to the outside of the hard conduit 104.

Convection currents are schematically shown moving upwards from the heating element 106 with curvy lines forming rays with arrow heads. In some embodiments, the heating element 106 may be constructed with various holes in it which make installation in a pot full of water easier. The heating element 106 may also be configured with feet or supports 204 allowing water to be below or underneath the heating element. Configurations of the heating element 106 with supports 204 and holes 402 enhances the convection circulation. In one implementation, the holes 402 may be a single hole. Since the heating element 106 of the sous vide cooking appliance 100 will create convection currents with or without holes 402 (shown on FIG. 4) and supports 204 (shown on FIGS. 2A and 2B,) the holes and supports are optional elements. The hot water, heated by the silicon-encased heating element 106 on the bottom of the container 112, will rise and the cooler water from above will fall, creating a continual convection current flow in the water bath resulting in relatively constant temperature throughout the water bath. The holes 402 in the heating element 106 are not necessary for convection circulation to occur, but are helpful if not at times necessary to help get the heating element onto the bottom of a container 112 full of water. It is a lot easier to put a strainer down in a pot of water than it is to lower a solid bottomed item. With the holes 402 in the heating element 106, there is much less resistance from the water in the container 112 during lowering, because the water will go through the holes as the heating element is inserted into the water bath. The shape of the heating element 106 is discussed further in FIG. 14 and FIG. 15.

Figure 1C:
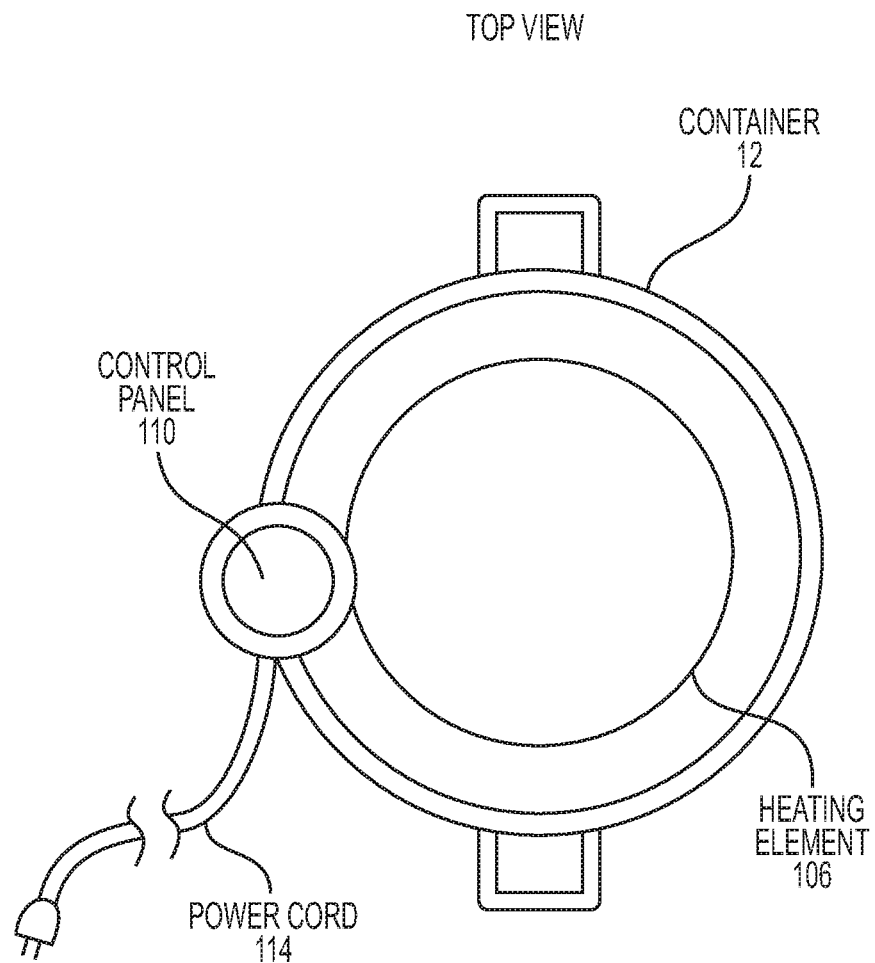
FIG. 1C is a top view of an exemplary sous vide cooking appliance in a stock pot.

FIG. 1C is a schematic of a top view of the sous vide sous vide cooking appliance 100 in an uncovered container 112. The control unit 102 is shown sitting on top of the edge of the stock pot. The control panel 110 is shown on the top side of the control unit housing. A clip assists the control unit housing to sit atop of the lip of the container 112. The heating element 106 is shown at the bottom of the container 112. Various types of heating elements 106 may be used with this embodiment. Side handles are shown for the container 112. A power cord 114 extends from the control unit housing to be plugged into an electrical outlet or extension cord. The sous vide cooking appliance 100 may be operated at various voltages and amperages to accommodate international electrical standards.

In many embodiments, the sous vide cooking appliance 100 uses a PID controller versus other temperature controllers. A PID controller versus other type of temperature controllers reduces overshoot as the temperature is rising to the set temperature, as well as undershoot. A PID controller assists in maintaining the temperature to within a half degree or so over the many hours that sous vide cooking sometimes requires.

While some appliance embodiments use multiple temperature sensors, one temperature sensor 108 is sufficient. In single sensor embodiments, whether using a flexible conduit 104 (or flexible wire set up) or a solid conduit, locating the temperature sensor 108 at roughly the midway point between the bottom of the pan (or the top surface of the heating element 106) and the surface of the water is helpful with accuracy. Additional temperature adjustments may be used when the temperature sensor 108 is located at a height that is far from the midway point.

In some embodiments, sensors are used to determine whether the level of water is below a threshold or desired level. Temperature sensors 108 or other sensors may be used for this purpose. The sensors sense the lack of water present or a sense a temperature or temperature differential indicating no water at the temperature sensor 108. An alarm or other notification is provided by the control unit if the water level is low.

In embodiments in which the conduit 104 is a solid structure, hinging the heating element 106 from the solid conduit may be desirable. The hinged heating element 106 may be folded up and towards the solid conduit carrying the wires to the heating element at the bottom of the appliance. Folding makes storage and transportation of the sous vide cooking appliance 100 easier.

In some embodiments, the heating element 106 is configured to lay at the bottom of the pot or cooking basin. To accommodate this positioning of the heating element 106 with different height pots and containers, the solid conduit's length is configured to adjust. In one embodiment, the conduit 104 includes a telescopic length adjustment. In this manner, it is possible to have the heating element 106 on the bottom of the container 112 regardless of the height of the container. The conduit 104 telescopes by three or four inches, for example, to accommodate most pots and plastic basins. For greater flexibility, the conduit 104 can be configured for adjustments of vertical height (for example adjustments of 1 to 2 inches, 2 to 5 inches, 2 to 7 inches, 3 to 10 inches, or greater) such that the conduit with adjustments is able to accommodate pots of a few inches tall to 24 inches tall or greater.

In some soft-conduit or flexible conduit configurations, a slightly weighted heating element 106 is used with a connection to the control unit housing by a flexible wire. In these embodiments, the resilience of the flexible wire must be adequate, as wires tend to break when they are bent, straightened, and re-bent repeatedly. The wrapping of the electric wire for its full length to the heating element 106 must be watertight. Also, in these flexible embodiments the temperature sensor(s) 108 are placed along the electric wire either inside or outside of a protective wrapping. Temperature adjustment algorithms are simplified when the single temperature sensor 108 is about halfway between the bottom of the water and the top or if multiple temperature sensors are spaced apart in height. The soft or flexible conduit configurations make the sous vide cooking appliance 100 even more compact and easy to store or transport.

Figure 2A:
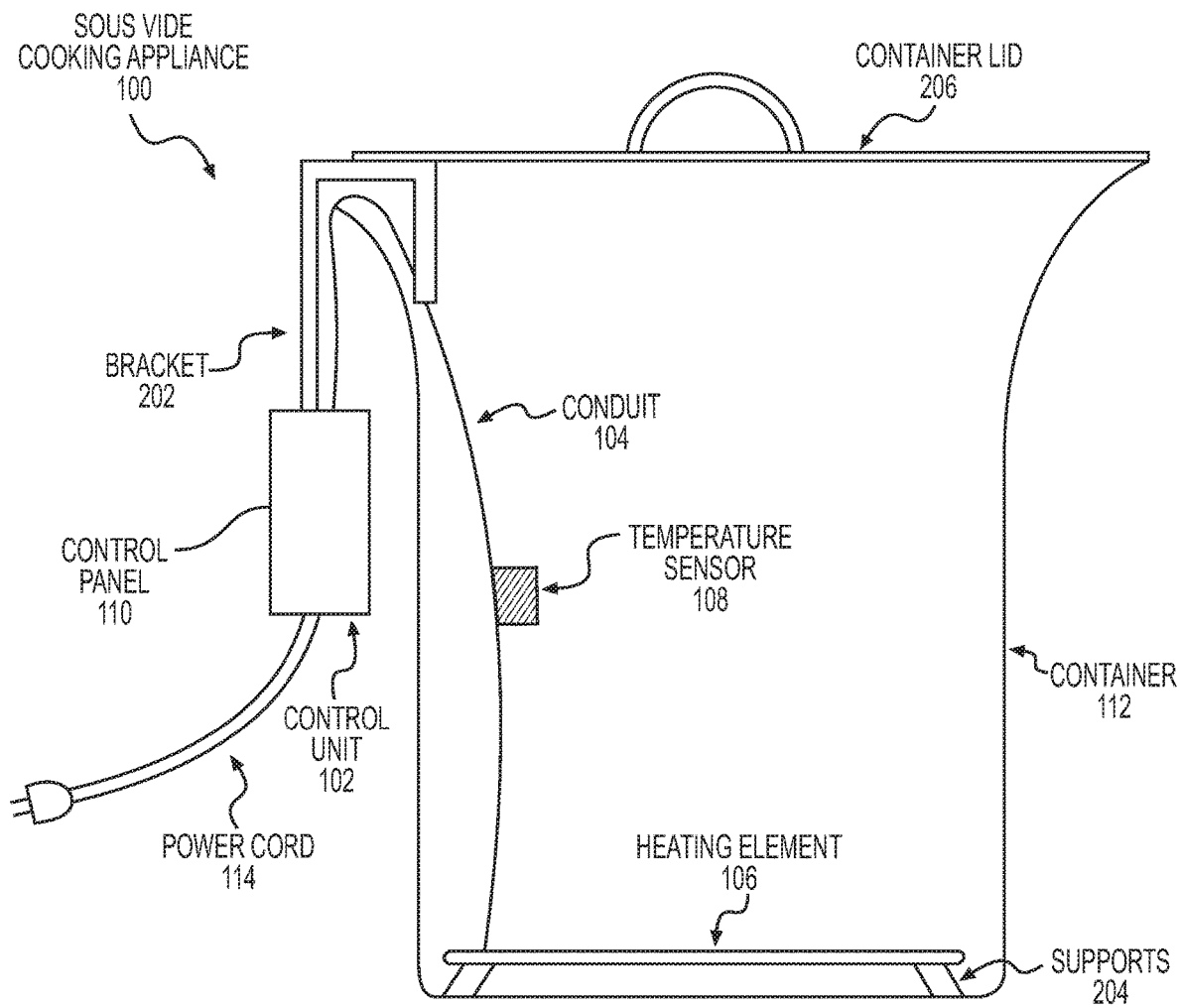
FIG. 2A is a cut-away side view of an embodiment of a sous vide cooking appliance with a soft conduit used with a stock pot having a lid.

FIG. 2A shows a cut-away side view of a container 112, e.g., a stock pot, with a sous vide cooking appliance 100 mounted on the side of the pot and using a flexible conduit 104 or wire. The sous vide cooking appliance 100 includes a control unit 110 with a control unit housing enclosing electronics, a bracket 202, a power cord 114, a flexible conduit 104, a temperature sensor 108 mounted to the flexible conduit approximately midway, and a heating element 106 with supports 204 connected to the flexible conduit 140. In this embodiment, the control unit 102 housing hangs from the side of the container 112 on a "C" clip or bracket 202. In this configuration, the container lid 206 may be closed, nearly closed or partially closed onto the top of the container 112. A soft-conduit or flexible conduit 104 is used to bring electric power from the control unit 102 housing to the heating element 106. The conduit 104 crosses over the lip of the container 112 and down inside the container. The container lid 206 may close on the "C" clip bracket 202 or on the conduit 104 or both. A heating element 106 with supports 204 is sitting on the bottom of the container 112.

Figure 2B:
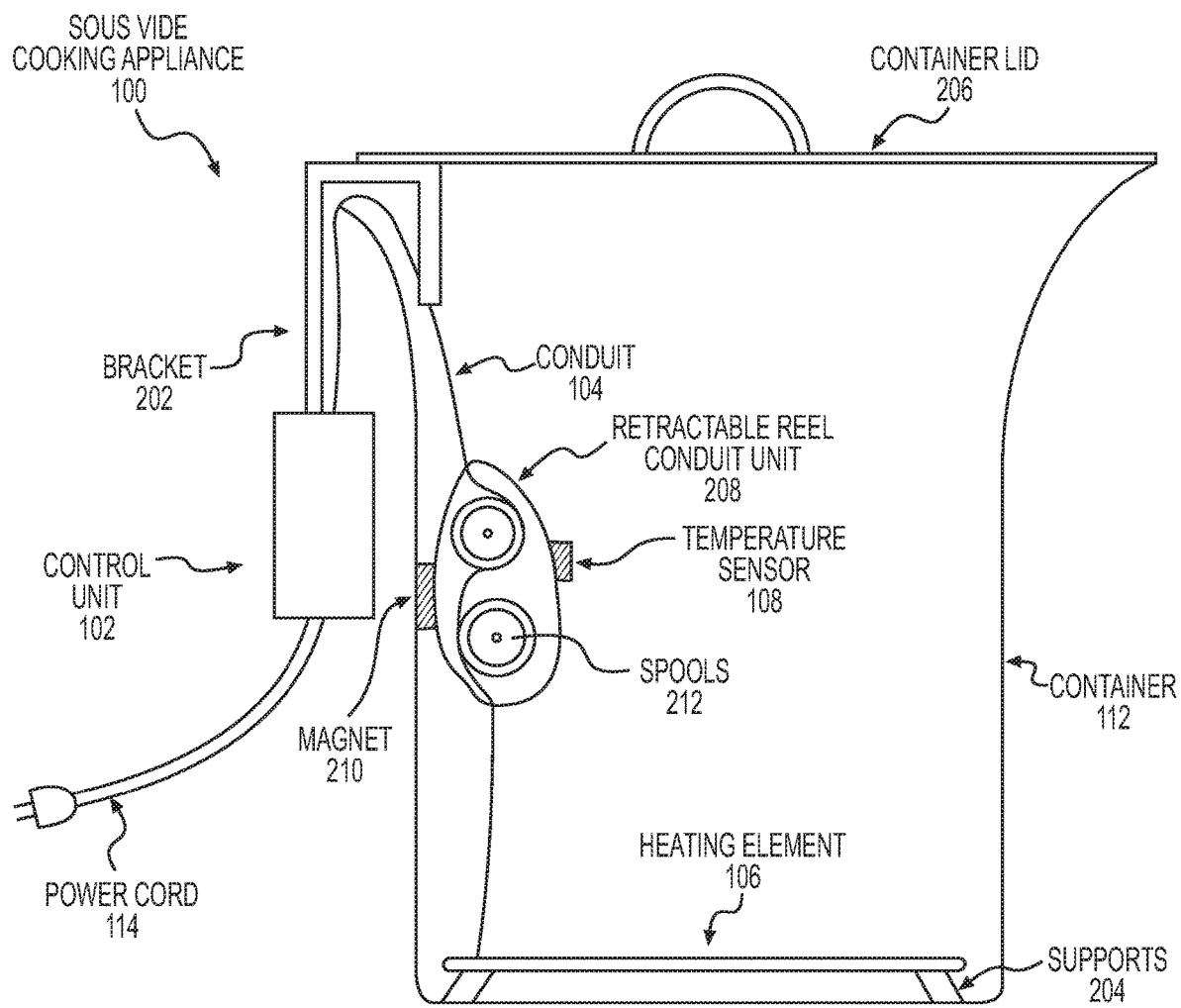
FIG. 2B is a cut-away side view of an embodiment of a sous vide cooking appliance with a soft conduit and a spooling device used with a stock pot having a lid

FIG. 2B shows a side view of an embodiment of a sous vide cooking appliance 100 with a soft or flexible conduit 104 and two hanging clips holding the control unit housing over the side of a container 112. In this view, the control panel 110 can be seen pointing outward from the side of the container 112. A container lid 206 is shown being placed atop the container 112. A power cord 114 is also shown extending from the control unit 102 housing to be plugged into an electrical source.

Figure 3:
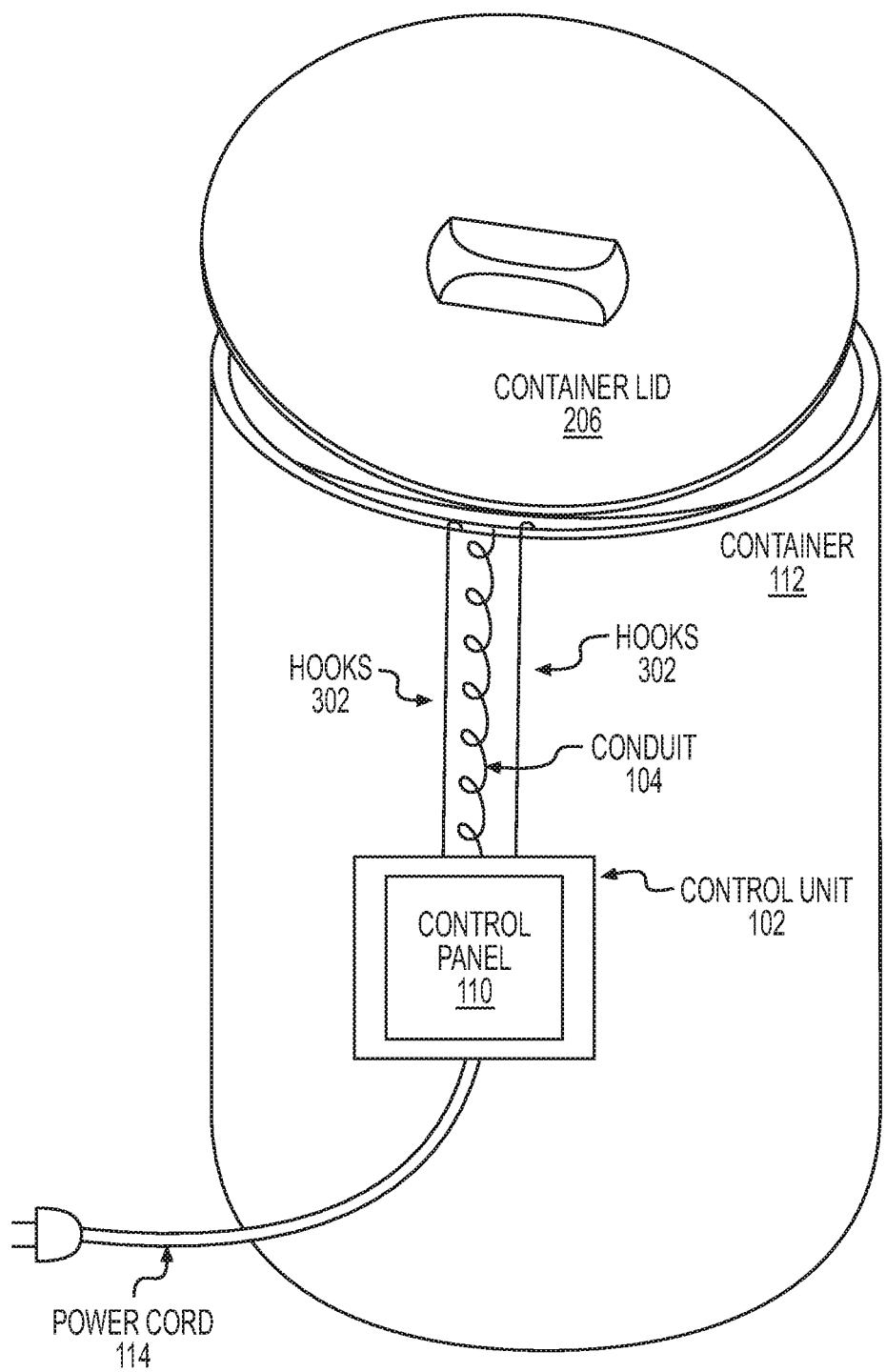
FIG. 3 illustrates a schematic view from outside a stock pot having a lid placed atop of an alternative embodiment of a sous vide cooking appliance.

As shown in FIGS. 2 and 3, in soft or flexible conduit embodiments, the control unit 102, in particular, the housing for the control unit, can be located outside the container 112 and out of the way of the container lid 206. In one embodiment, the control unit 102 hangs from the top lip of the container 112 (using one or two clips 202) along the outside of the container. In this embodiment, the control panel 110 or controls on the control unit 102 face out from the side of the container 112. With this embodiment, users may use the container lid 206 to cover the container 112 during sous vide cooking. The thickness of the clips 202 for hooking the control unit 102 to the lip of the container 112 and the thickness of the flexible wire conduit 104 can be kept to a minimum to allow the container's lid 206 to close as much as possible. Closing the container's lid 206 eliminates the need for wrapping tin-foil over the top of the pot, or placing floating ping pong balls in the pot, or doing any of the other things users have to do with immersion circulators to minimize water loss from water evaporation out of the pot. The clips 202 and flexible or wrapped wire conduit 104 can be configured to block steam flow from gaps formed between the container lid 206, container 112, clips 202 and conduit 104. Rubber, silicone, plastic or other materials may be used to minimize the gap or gaps formed when the sous vide cooking appliance control unit 102 hangs over the side of the container 112. The additional material or gap filler can smooth out the bumps or lift created by the clips 202 and conduit 104 and allow the lid to uniformly make contact the gap filler.

Referring to FIG. 2B, in soft conduit embodiments, the soft conduit 104 length may also be adjustable. In addition to the components shown in FIG. 2A, the embodiment of FIG. 2B includes a retractable reel conduit unit 208 having a magnet 210 and temperature sensor 108 attached. In one embodiment, a retractable reel conduit unit 208 is used in the water to adjust the length of a flexible conduit 104. For example, as shown in FIG. 2B, the sous vide sous vide cooking appliance 100 includes a retractable reel conduit unit 208 positioned about half way between the container lid 206 and the heating element 106. This retractable reel conduit unit 208 may also include the temperature sensor 108 mounted on the inside or outside of the reel housing. This retractable reel conduit unit 208 may extend the soft conduit 104 length in one direction (between retractable reel conduit unit 208 and control unit 102) or the other direction (between retractable reel conduit unit 208 and heating element 106) or both (bi-directional). In some embodiments, the retractable reel conduit unit 208 spools the excess flexible wire.

FIG. 2B shows a retractable reel conduit unit 208 that is bi-directional and includes two spools 212. One or two spools 212 may be used to gather the excess conduit 104 wire. As shown in FIG. 2B, the retractable reel conduit unit 208 may also include a magnet 210 to help the retractable reel conduit unit 208 adhere to the side of a metal container 112. While the magnet 210 is shown mounted to the outside of the retractable reel conduit unit 208 housing, it may be located within the housing. In other embodiments, the retractable reel conduit unit 208 is located near or closer to the control unit 110 and in yet other embodiments, the retractable reel conduit unit 208 is located near the heating element 106.

In some embodiments, a temperature sensor 108 is mounted to the outside of the retractable reel conduit unit 208 as shown in FIG. 2B. Alternatively, the temperature sensor may be mounted inside the retractable reel conduit unit 208 housing. In some embodiments in which the temperature sensor 108 is on the inside of the conduit 104 or inside of a retractable reel conduit unit 208, sealed from contact with water in the water basin, a temperature adjustment is used. In other words, if the temperature sensor 108 is inside a hard or soft conduit 104 and does not make contact with the water, a temperature adjustment is available to determine the actual water temperature from the proxy temperature measured in the sealed environment by the temperature sensor. In these embodiments, the PID controller includes a temperature adjustment algorithm which adapts the temperature sensor 108 readings from inside of the conduit 104 or inside the retractable reel conduit unit 208 to actual water temperature. The indirect temperature reading of the temperature sensor 108 is adjusted to reflect the actual temperature of the water. In some embodiments with sealed temperature sensors 108, the conduits 104 are made from materials which will conduct heat such as stainless steel, other metals or other materials with good heat conductive properties.

FIG. 3 shows that, in some configurations, the control unit 110 can hang down from the lip of the pot over the side of a container 112 on hooks 302 or the like. In one embodiment, the control unit 102 is hung well over the side of the container 112 away from the container lid 206. When using a container lid 206 on the container 112 or other cooking vessel, the opening caused by the hooks 302 to hang the control unit 102, direct the steam in the direction of the control unit. By hanging the control unit 102 below the level of the top of the pot, the steam will rise and not directly hit the control unit. With the control unit 102 hanging off the side of the container 112, a soft conduit 104 configuration is preferred with the conduit 104 traveling over the side of the container 112 and down to the heating element 106.

Figure 4:
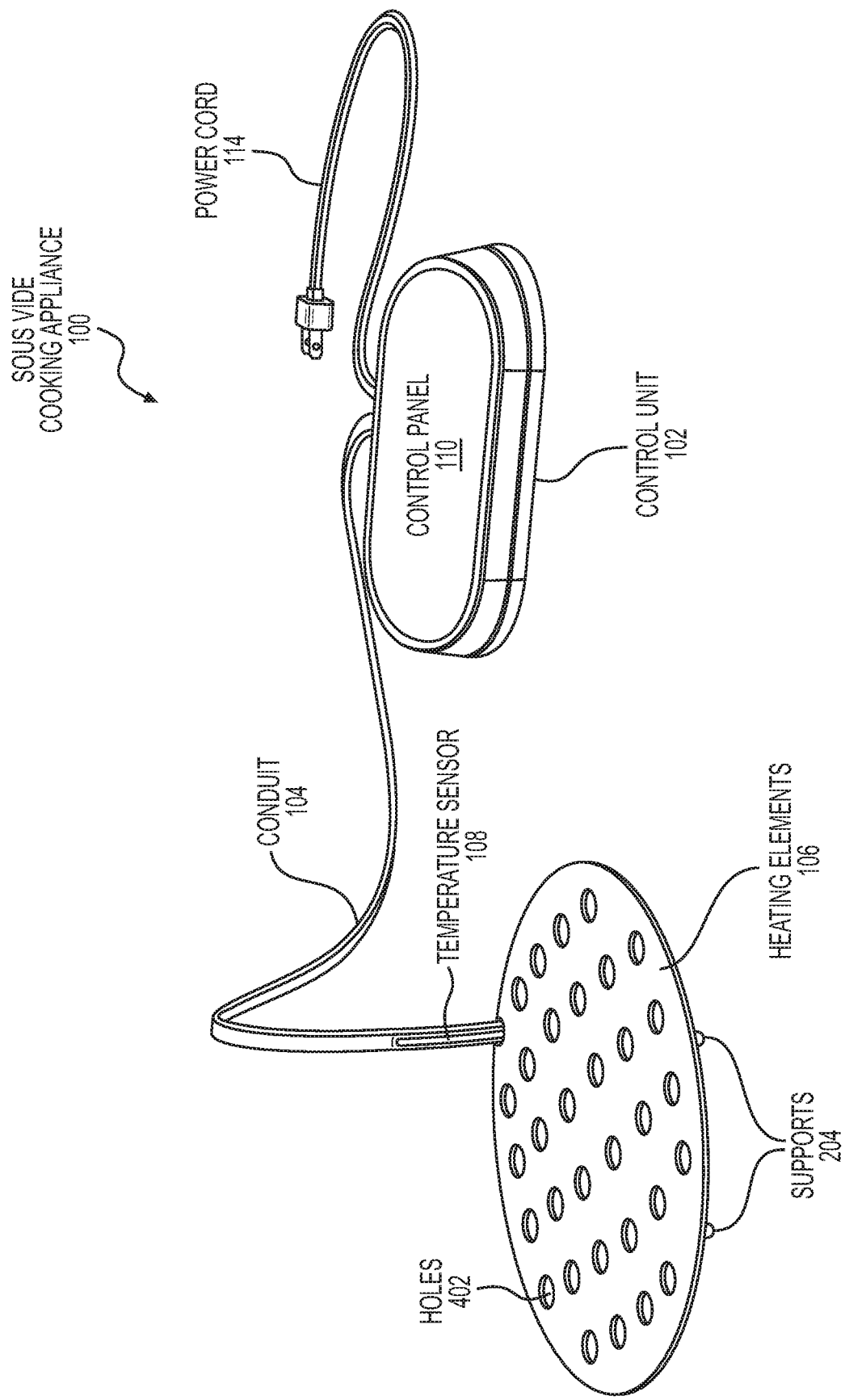
FIG. 4 shows an additional embodiment in which the control unit and control panel are in a separate housing outside of the container and connected by a wired conduit.

FIG. 4 shows an additional embodiment in which the control unit 102 and control panel 110 are in a separate housing outside of the container 112 and connected by a wired conduit 104. In this embodiment, the wired conduit 104 may be flexible and connect the heating element 106 to the control unit 102 with the control panel 110, which may lie on a surface external to the container 112, such as a counter top. This system has an advantage that the electronics are away from the water and heat source, there are no moving parts, and it is easy to clean. In some embodiments, the control unit 102 has a flat rubber bottom for securing it to a counter. In other embodiments, the control unit 102 has supports 204 beneath the base for air flow. The electronics are located with the control unit 102. A battery back-up power may be included.

In one embodiment, the conduit is a flat cable for a lower profile throughout or at the point where the cable exits the pot to minimize the gap between the container lid 206 and the container 112. A lid may be used with a cut-out for the flat cable. In another embodiment, the supports 204 may be weighted to keep the heating element 106 and cable submerged. A number of supports 204 of varying type may be used.

In one implementation, there are two temperature sensors 108 on the wire leading to the heating element 106, one near the heating element, and one a few inches up, for example. The temperature sensor 108 by the heating element 106 informs the control unit 102 if the container 112 has water in it when it is turned on. This can be accomplished by sensing whether liquid is present or sensing the temperature to determine the presence of a liquid.

In another implementation, the control unit 102 has a safety feature which automatically turns off the machine if the temperature near the heating element changes outside of the norm, too high or too low. For example, if the temperature goes up too quickly, which is a sign that there is no water in the pot or the system is overheating, the safety feature will turn the system off. If the temperature remains unusually low for an extended period of time, it could signify a fault in the system requiring shut-down. In some embodiments, the control panel will stay on but power to the heater is turned-off for safety reasons. Once the container 112 has water and is heating normally, the control unit 102 reads the temperature from the temperature sensor 108 several inches up from the bottom, which is the temperature about at mid-depth of the water and reflects the temperature throughout the water as the convection currents keep it moving. The control unit 102 may also get feedback from the lower temperature sensor 108, but that will typically be a little warmer since it is almost right on the heating element. Additional temperature sensors may be used at other locations along the line or in the system. In some embodiments, the system averages the temperatures between sensors. In other embodiments, temperature correction calculations are used and in yet other embodiments, temperature conversion factors are used for one or more of the temperature sensor readings.

Additionally, given that different-sized heating elements 106 may be used, the control unit may also regulate the power provided to the heating element 106 based on its size. Generally, larger heating elements 106 are provided more power. In some embodiments, the heating elements 106 are exchanged by plugging or unplugging them into the system 100.

In one implementation, the control unit 102 may be connected to more than one heating element 106 at a time. For example, the control unit 102 may control a heating element 106 in one pot cooking one type of food, while controlling another heating element in another pot cooking a different type of food. The control unit 102 is used to set the water temperature and different water temperatures may be programmed for each heating element 106. Also, different timers may be set for each heating element 106 depending upon the cooking time required for each food.

Figure 5:
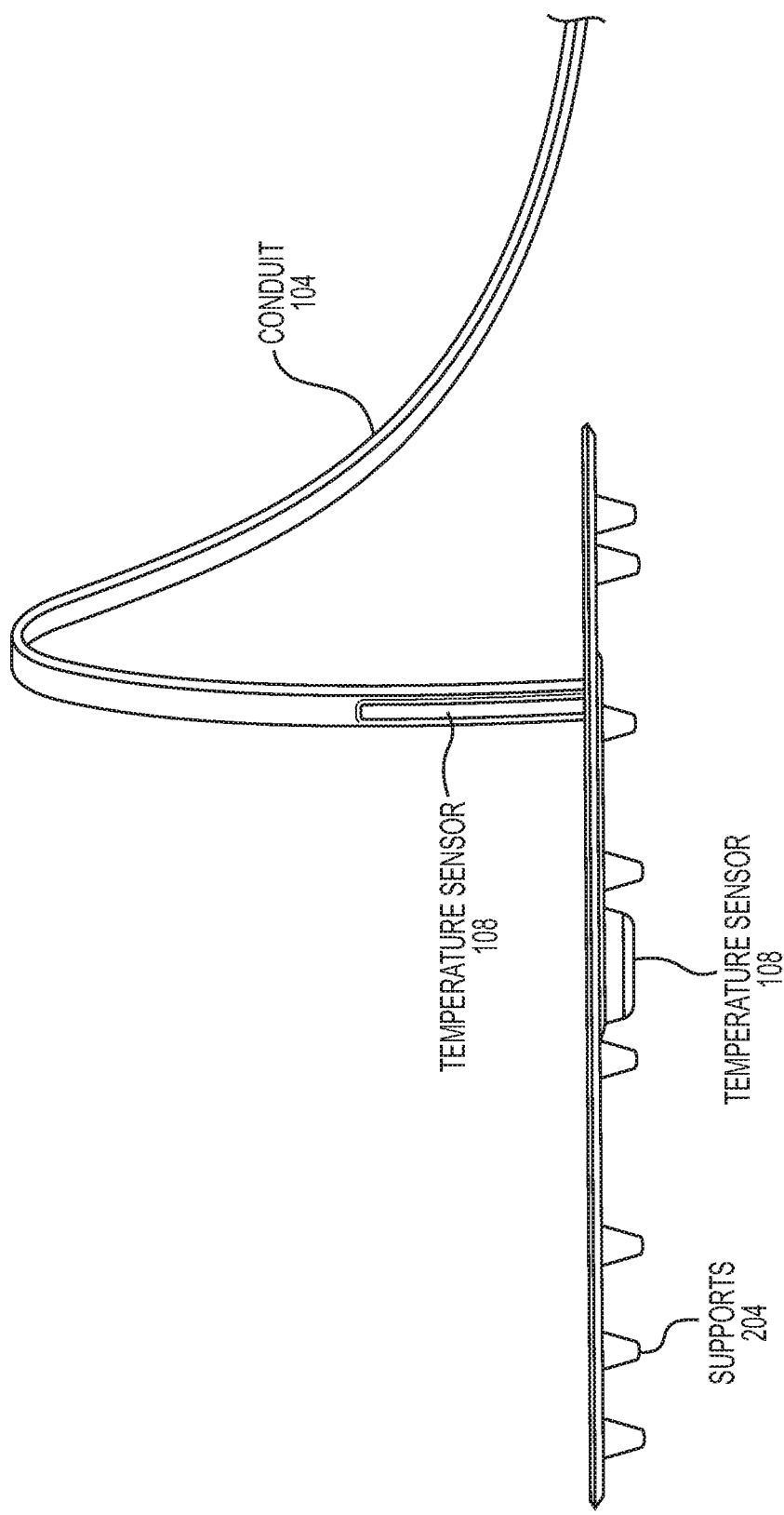
FIG. 5 illustrates the heating element of the embodiment of FIG. 4, in which the control unit is housed separately.

FIG. 5 illustrates the heating element 106 of the embodiment of FIG. 4, in which the control unit is housed separately. As shown, the sous vide cooking appliance 100 may have two temperature sensors 108, one centered on bottom of the pad, and one up the side wall of the container 112 at the base of the conduit 104 near the heating element 106. In one implementation, this may be 2.25 inches up the side wall of the pot, for example. Additional heating elements 106 may be placed on the conduit 104.

The heating element 106 may also be foldable for ease of storage. There may be a hinge at the base where the conduit 104 connects with the heating element 106. Examples of hinges are described earlier.

Figure 6:
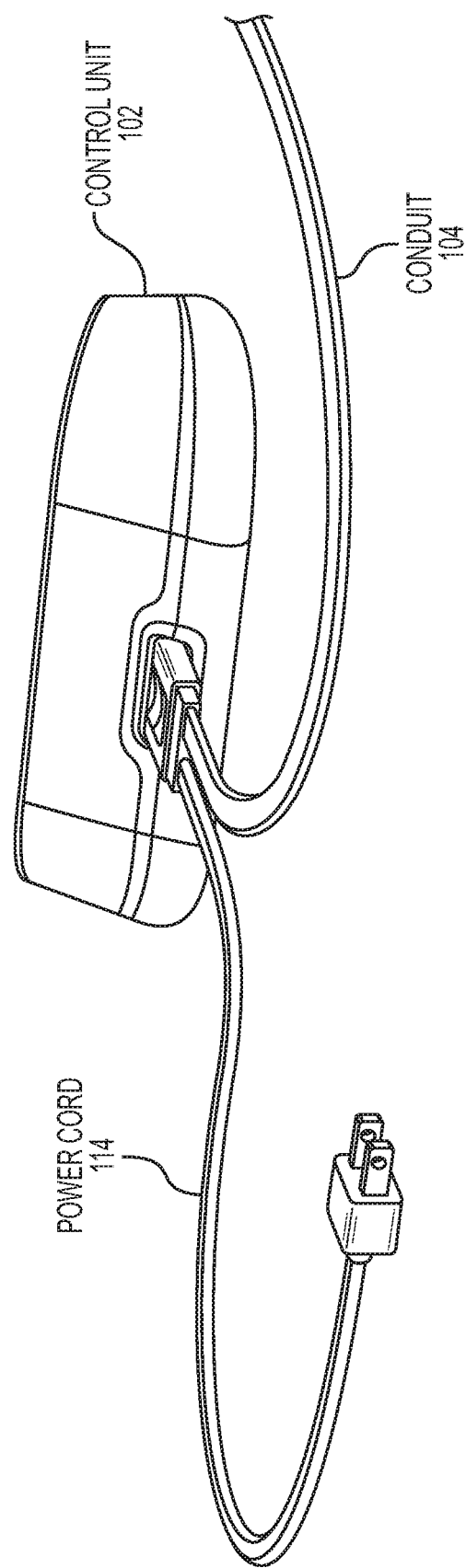
FIG. 6 illustrates the back of the control unit of the embodiment of FIG. 4, in which the control unit is housed separately but connected by a flexible conduit.

FIG. 6 illustrates the back of the control unit 102 of the embodiment of FIG. 4, in which the control unit is housed separately but connected by a flexible conduit 104. As shown, there may be a single plug for simplicity of device setup at the user's end, such that the plug from the conduit 104 and the power cord 114 are connected and plug into the back of the control unit 102. In other embodiments, there are two plugs.

Figure 7:
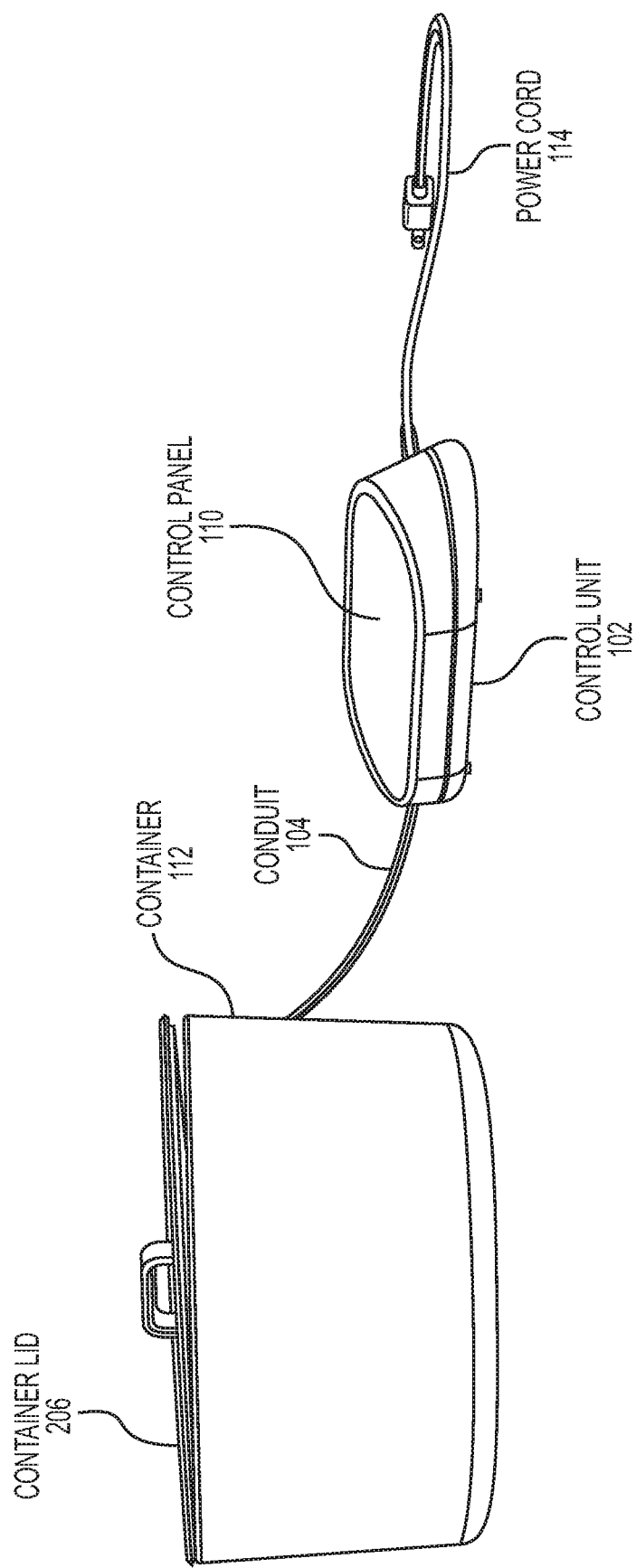
FIG. 7 shows external view of a container, control unit, power cord and conduit 104 of the embodiment shown in FIG. 4 in front of the control unit.
Figure 8:
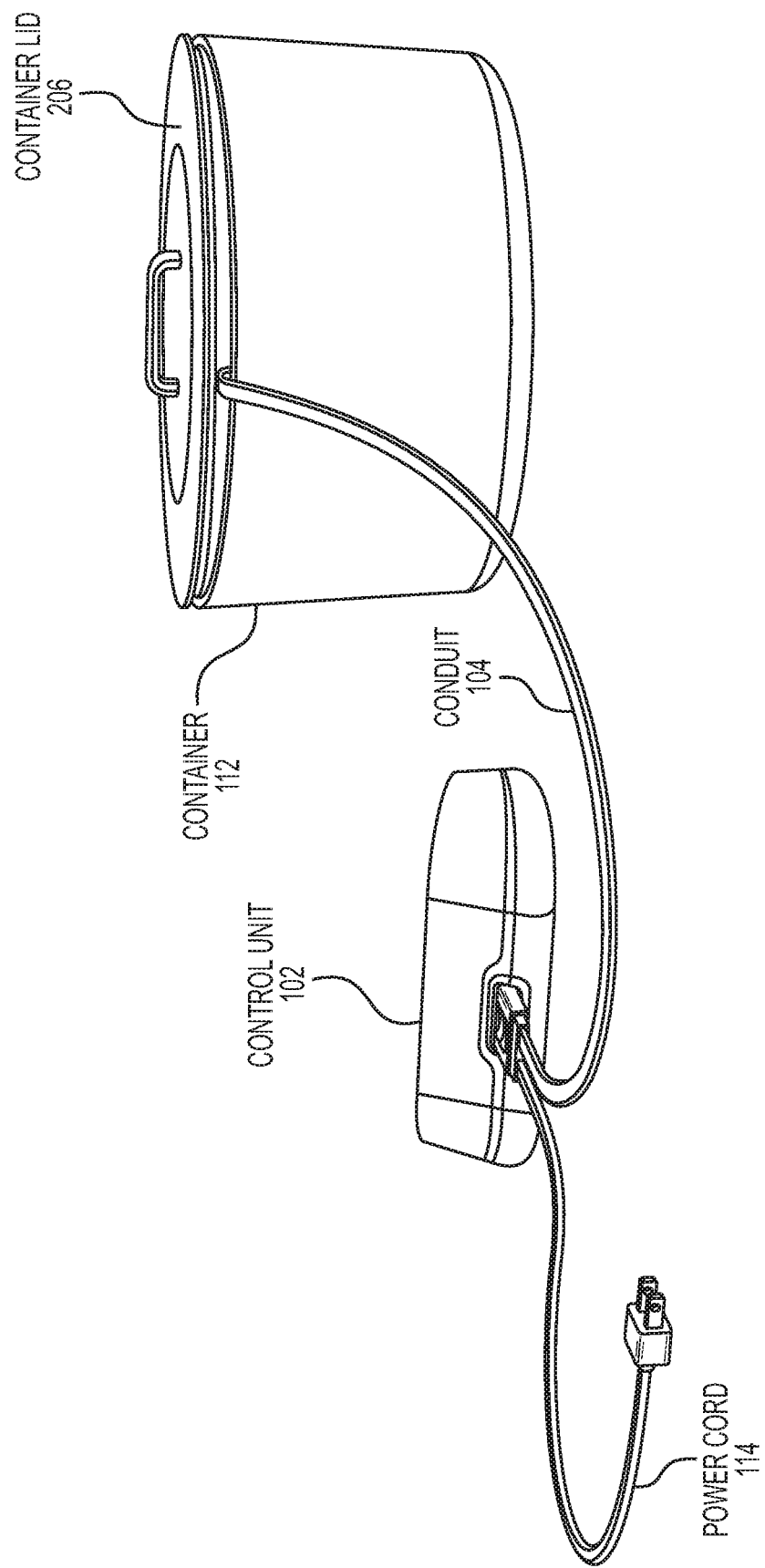
FIG. 8 show external view of a container, control unit, power cord and conduit of the embodiment shown in FIG. 4 from behind the control unit.

FIGS. 7 and 8 show external view of a container 112, control unit 102, power cord 114 and conduit 104 of the embodiment shown in FIG. 4 from in front and behind the control unit 102.

Figure 9:
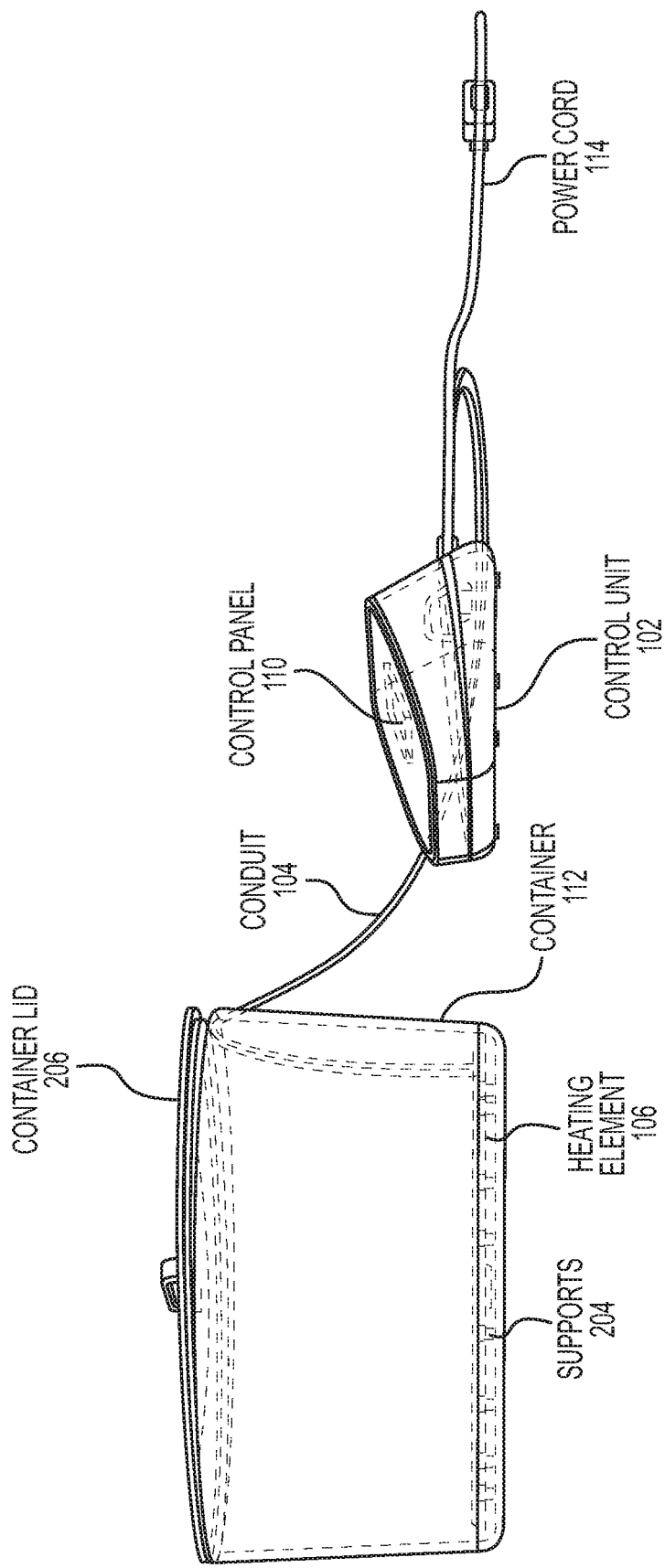
FIG. 9 shows see-through views of a container, control unit, power cord, conduit of the embodiment shown in FIG. 4 in front of the control unit.
Figure 10:
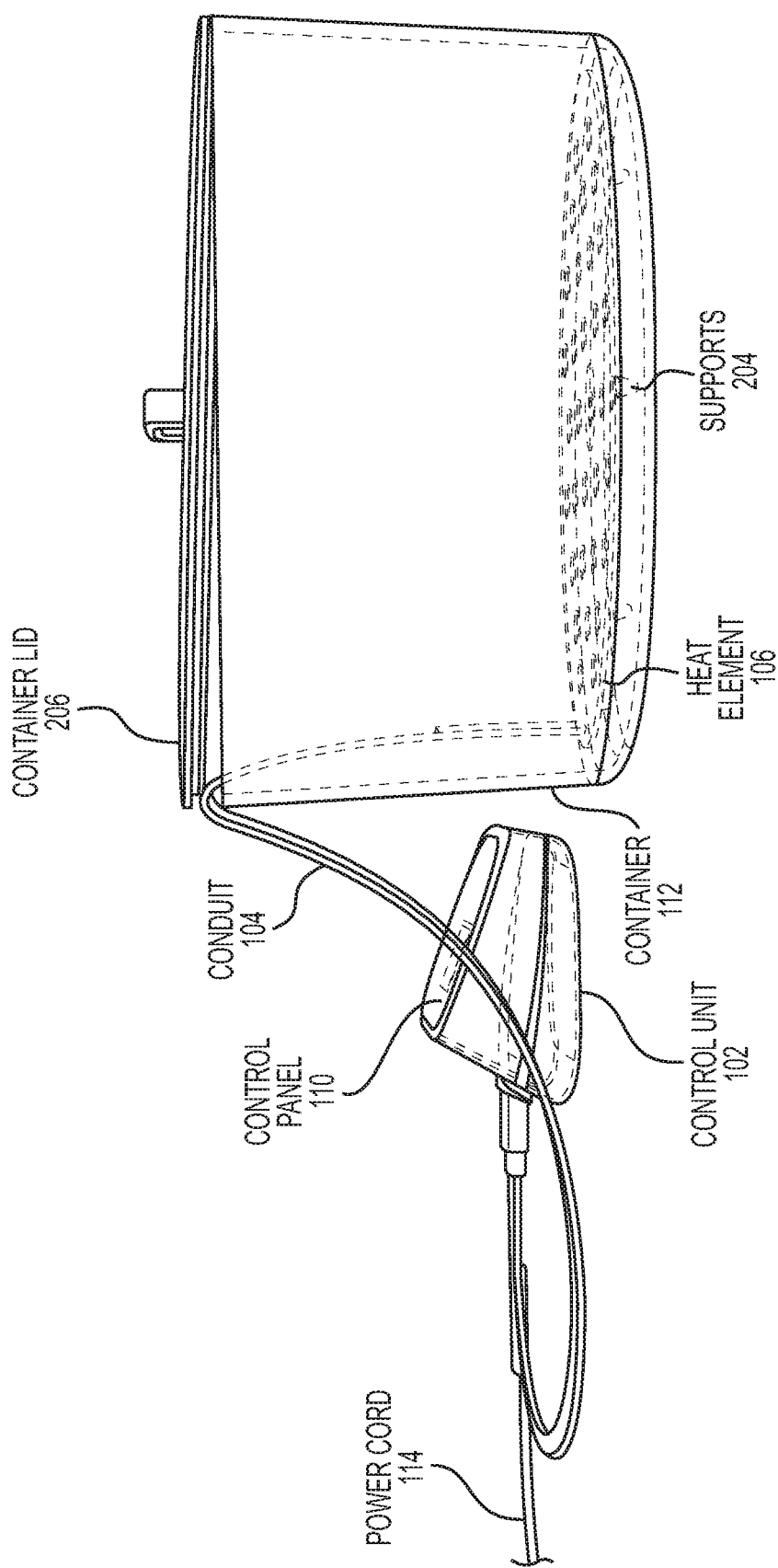
FIG. 10 shows see-through views of a container, control unit, power cord, conduit of the embodiment shown in FIG. 4 from behind the control unit.

FIGS. 9 and 10 show see-through views of a container 112, control unit 102, power cord 114, conduit 104 of the embodiment shown in FIG. 4 from in front and behind the control unit 102. In this view, the heating element 106 may be seen in the container 112

Figure 11:
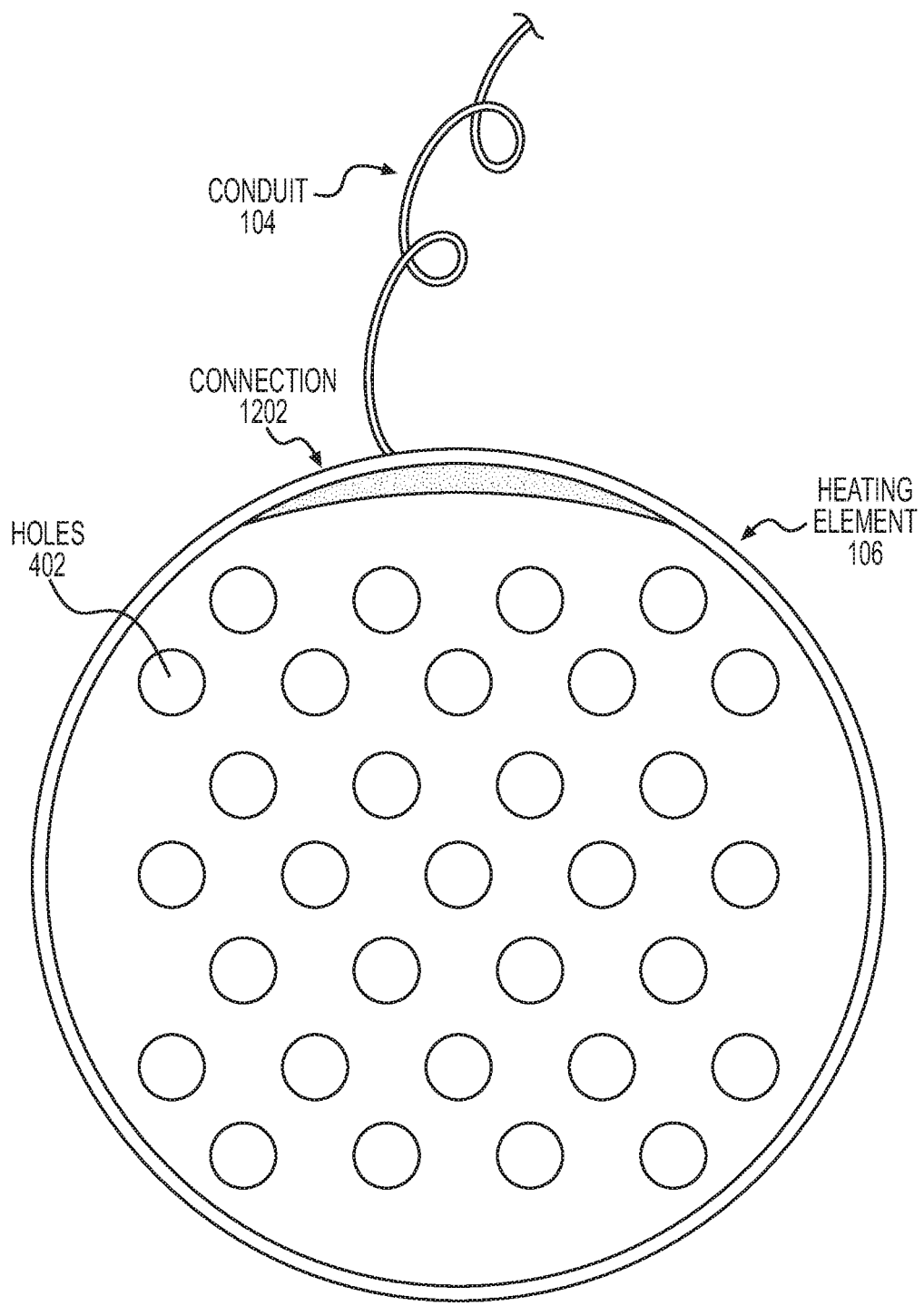
FIG. 11 is a top view of a heating element with holes having a flexible wire connection.
Figure 12:
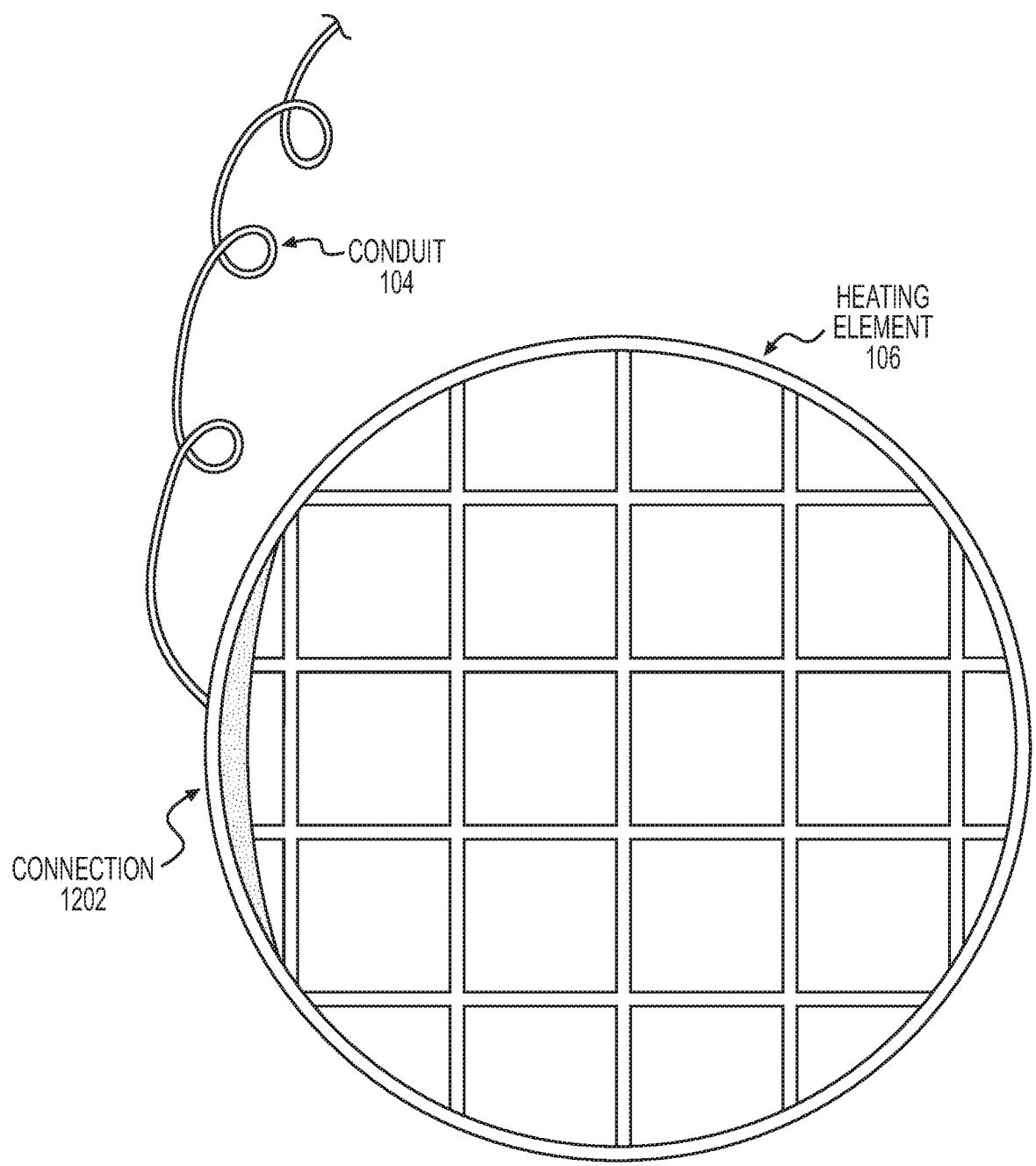
FIG. 12 is a top view of a heating element shaped as a grating with a flexible wire connection.

FIGS. 11 and 12 show alternative embodiments of heating elements 106. In particular, FIG. 14 shows a heating element 106 with holes 402 and FIG. 15 shows a heating element 106 generally in the shape of a grating. Various materials may be used to form the heating element 106. These heating elements 106 are adapted to be submerged into the water basin of a pot or other container 112. Silicone encasing, rubber encasing or other water tight casing may be used to protect the heating element 106 from the water. A connection 1202 must be made between the heating element 106 and the conduit 104 wire carrying electric power to the heating element. In various embodiments, the connection 1202 is durable and has some flexibility. Silicone, rubber or other material may be used to encase the connection 1202 and provide it protection from pulling apart.

Figure 13:
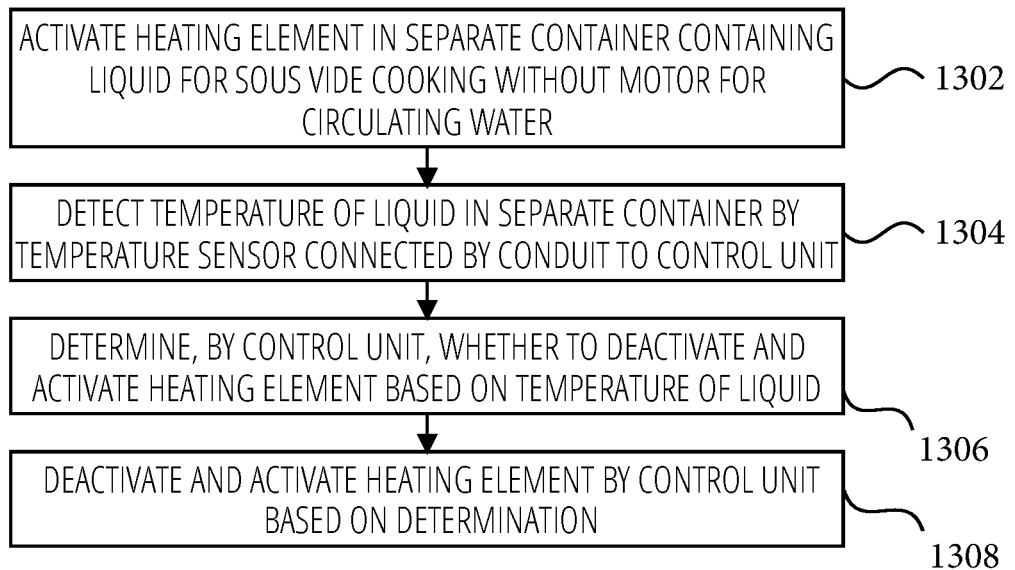
FIG. 13 illustrates a flowchart of a method in accordance to one embodiment.

FIG. 13 illustrates a flowchart 1600 of a method in accordance to one embodiment. The control unit 102 activates the heating element 106 in a separate container 112 containing a liquid for sous vide cooking without a motor for circulating water (step 1602). The temperature sensor 108 detects a temperature of the liquid in the separate container 112 (step 1604). The control unit 102 determines whether to deactivate and activate the heating element 106 based on the temperature of the liquid (step 1606). The deactivates and activates the heating element by the control unit based on the determination (step 1608). In one implementation, the control unit 102 may keep the temperature of the liquid within a 1 degree range, for example, by controlling the heating element 106, for sous vide cooking. Other ranges may be also be used.

To begin, a user may put the heating element 106 in a separate container 112, and turn on the control unit 102 using the control panel 110. The user may also disconnect the heating element 106 from the control unit 102, and connect a different heating element of a different size than the original heating element to the control unit. Additionally, a second heating element may be connected to the control unit 102, and be used in a different container 112 at the same time as the original heating element 106.

A seller of the sous vide cooking appliance 100 can provide one or more of the system elements described. For example, a seller may provide a consumer the control unit 102, power cord 114, conduit 104, temperature sensors and one or more hinged or unhinged heating elements 106. In distributed sous vide appliances 100 in which multiple heating elements 106 are provided, they may be of different sizes.

In alternative embodiments, the control unit 102 electronics are solely battery powered and in yet other embodiments run on battery or electricity interchangeably. In some embodiments, the batteries are stored with the control unit 102 housing, in others it is external to the housing. Battery power or battery back-up power for the control unit provides safety against power outages by arming the user with valuable information about the food being cooked, for example, when the power went out, how long the power was out, and for how long at what temperature the food was left to cool off. Knowing the coldest temperature the food was subjected to in the water bath is useful information. Also, knowing the length of time that the food was exposed to reduced temperature is useful to calculate risk of spoilage. For food safety, this type of knowledge is helpful in order to determine whether the food must be discarded or can be cooked, reheated and/or eaten. Various methods may be used to determine risk of spoilage using on information on temperature and time. In one embodiment, the entire sous vide cooking appliance 100, including the heating element 106, is solely on battery power or has an available battery back-up. The cordless or battery only configuration allows for remote operation of the cooking appliance 100 without an electric wall outlet. The battery back-up configuration can accommodate power outages. In one embodiment, the battery unit is a self-standing device remaining on the counter and not attached to the pot or water container 112.

The sous-vide cooker appliance 100 is described as being used with water. However, other fluids may be used in the bath.

In one embodiment, the electric wire is housed in a water tight conduit connecting the control unit housing to the heating element.

In another embodiment, the conduit length is adjustable from 1 to 12 inches, or adjustable from 4 to 20 inches.

In yet another embodiment, there is a flexible waterproof cover connecting the control unit to the heating element, and the electric wire is located within the flexible cover. Furthermore, the conduit may include a flexible covering for the electric wire leading to the heating element that is water tight.

The heating element may further comprise slots for water to pass through, or a grating, and the grating may have equally spaced apart parallel heating components. The heating element may be a circular grating with equally spaced apart parallel heating components arranged longitudinally and latitudinally in a two-dimensional grid.

The sous vide cooking appliance 100 may also comprise two or three temperature sensors spaced apart in height. The one or more temperature sensors may also be attached to the outside of the conduit.

The foregoing description of various embodiments provides illustration and description, but is not intended to be exhaustive or to limit the invention to the precise form disclosed. Modifications and variations are possible in light of the above teachings or may be acquired from practice. It is to be understood that the invention is intended to cover various modifications and equivalent arrangements included within the spirit and scope of the claims.

What is claimed is:

1. A device for use with a separate container holding water, comprising:
    a portable cooking appliance configured for sous vide cooking while immersed in the water in the separate container, comprising:
    a control unit comprising:
        a PID (Proportional Integral Derivative) controller; and
        a control panel;
    a battery operably connected to the control unit;
    a flat heating element configured to be located inside and at the bottom of the container immersed in the water, and that causes convection current movement of the water in the container upward from the heating element;
    a wire operably connected from the control unit to the heating element to provide power to the heating element;
    a conduit connecting the control unit to the heating element and wherein the electric wire is contained within the conduit between the control unit and the heating element;
    a temperature sensor attached to the conduit and operably connected to the control unit, wherein the temperature sensor senses a temperature of the water; and
    wherein the PID controller controls, to within 1 degree, the temperature of the water in the container using the temperature sensor and the heating element;
    wherein, during an electric power failure, the battery powers the control unit;
    wherein, after the electric power failure, the control panel displays how long the power was out and the coldest temperature of the liquid; and
    wherein the portable cooking appliance circulates water without a motor.

2. The portable cooking appliance of claim 1, wherein the heating element comprises feet and wherein some of the water is located below the heating element.

3. The portable cooking appliance of claim 1, wherein the heating element comprises one or more holes for the water to pass through.

4. The portable cooking appliance of claim 1, further comprising more than one temperature sensor.

5. The portable cooking appliance of claim 1, wherein the PID controller receives a temperature from the temperature sensor, determines the temperature of the water in the container and controls the power to the heating element.

6. The portable cooking appliance of claim 5, wherein the PID controller adjusts the temperature received from the one or more temperature sensors using a temperature adjustment algorithm to determine a water temperature for water in the container.

7. The portable cooking appliance of claim 1, further comprising a second heating element.

8. The portable cooking appliance of claim 1, further comprising a connection between the conduit and heating element, the connection comprising a hinge.

9. The portable cooking appliance of claim 1, wherein the control panel is configured to receive input from a user.

10. The portable cooking appliance of claim 1, further comprising three temperature sensors configured to detect a temperature of the water in the separate container.

11. The portable cooking appliance of claim 1, wherein the flat heating element comprises one or more feet and one or more holes for the water to pass through the heating element, wherein the water moves through the holes in an upward direction when the heating element is generating heat.

12. The portable cooking appliance of claim 1, wherein the control unit is configured to control a second heating element of a different size than the heating element.

13. The portable sous vide cooking appliance of claim 1 wherein the flat heating element further comprises a bottom and feet and the appliance further comprises a second temperature sensor, wherein the second temperature sensor is attached to the bottom of the flat heating element.

14. The device of claim 1 wherein if a condition of low water in the container or overheating is detected, the heater is turned off.

15. The portable cooking appliance of claim 1 wherein the heating element further comprises a silicon encasing.

16. A method of using a portable sous vide cooking appliance having a heating element, a control unit with a control panel, a battery and no motor for circulating water, comprising:

activating the heating element in a separate container containing water for sous vide cooking without a motor for circulating the water, the heating element connected to the control unit by a conduit;

detecting a temperature of the liquid in the separate container by a temperature sensor connected by a conduit to the control unit;

determining, by the control unit, whether to deactivate and activate the heating element based on the temperature of the water; and deactivating and activating the heating element by the control unit based on the determination; and wherein, during an electric power failure, the battery powers the control unit; and wherein, after the electric power failure, the control panel displays how long power was out and a coldest temperature of the water.

17. The method of claim 16, further comprising:
disconnecting the heating element from the control unit; and
connecting a second heating element of a different size than the heating element to the control unit.

18. The method of claim 16 further comprising submersing the heating element of the portable sous vide cooking appliance in the water in the separate container.

19. The method of claim 16, wherein there are two temperature sensors and wherein the detecting step uses both temperature sensors to determine the water temperature, the method further comprises keeping the temperature of the water within a 1 degree range by the control unit controlling the heating element.

20. The method of claim 16 further comprising determining whether a condition of low water in the container or overheating has occurred and wherein the heater element is deactivated if said condition is detected.

* * * * *